US 8,923,106 B2

(12) United States Patent
Chiu et al.

(10) Patent No.: US 8,923,106 B2
(45) Date of Patent: Dec. 30, 2014

(54) MEDIA DETECTION DURING DISC INSERTION

(71) Applicant: Microsoft Corporation, Redmond, WA (US)

(72) Inventors: Henry Chiu, San Jose, CA (US); Tse-Ching Yu, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/782,184

(22) Filed: Mar. 1, 2013

(65) Prior Publication Data

US 2014/0250445 A1    Sep. 4, 2014

(51) Int. Cl.
| | |
|---|---|
| *G11B 17/30* | (2006.01) |
| *G06F 13/10* | (2006.01) |
| *H04N 5/93* | (2006.01) |
| *G11B 19/12* | (2006.01) |

(52) U.S. Cl.
CPC ..................................... *G11B 19/12* (2013.01)
USPC ............. 369/53.22; 369/53.27; 720/601; 720/603; 720/606; 720/608; 720/619; 720/645; 360/99.06; 360/99.07; 360/99.15; 360/99.12

(58) Field of Classification Search
USPC ............................................ 360/98.05–99.15
See application file for complete search history.

(56) References Cited

U.S. PATENT DOCUMENTS

| | | |
|---|---|---|
| 4,979,160 A | 12/1990 | Araki |
| 6,957,442 B2 | 10/2005 | Hong et al. |
| 7,047,544 B2 | 5/2006 | Aoki |
| 7,180,840 B1 | 2/2007 | Kim |
| 7,492,685 B2 | 2/2009 | Jodorkovsky et al. |
| 7,724,622 B2 | 5/2010 | Masuda |
| 7,869,323 B2 | 1/2011 | Shin |

(Continued)

FOREIGN PATENT DOCUMENTS

| | | |
|---|---|---|
| JP | 2005-259252 A | 9/2005 |
| WO | 2008/102472 A1 | 8/2008 |

OTHER PUBLICATIONS

"International Search Report & Written Opinion for PCT Patent Application No. PCT/US2014/018405", Mailed Date: Jul. 7, 2014, Filed Date: Feb. 25, 2014, 9 pages.

(Continued)

*Primary Examiner* — Wayne Young
*Assistant Examiner* — Dionne Pendleton
(74) *Attorney, Agent, or Firm* — Gregg Wisdom; Judy Yee; Micky Minhas

(57) ABSTRACT

An optical disc drive (ODD) includes one or more sensors which detect a user placing a disc in the loading path. In response, a process is triggered for sensing the thickness of a protective layer of the disc even while the disc is moving toward a turntable. An initial determination of the type of the disc (e.g. CD, DVD or Blu-ray®) can be determined based on the thickness and reported to a host computing device. The host, in turn, determines an application to load based on the disc type. The loading of the application can begin sooner than if the ODD waited until the disc was seated on the turntable to detect the disc type. A final determination of the disc type can be made while the disc is seated as well. The host is informed if there is a disagreement between the initial determination and the final determination.

17 Claims, 13 Drawing Sheets

(56) References Cited

U.S. PATENT DOCUMENTS

| | | |
|---|---|---|
| 7,903,517 B2 | 3/2011 | Bakx et al. |
| 7,961,576 B2 | 6/2011 | Yoshimoto |
| 8,031,569 B2 | 10/2011 | Wehrenberg |
| 8,213,282 B1 | 7/2012 | Chang et al. |
| 8,234,665 B2 * | 7/2012 | Kato .............................. 720/626 |
| 8,272,004 B2 | 9/2012 | Tsai et al. |
| 2004/0022156 A1 | 2/2004 | Choi |
| 2005/0141356 A1 * | 6/2005 | Fujisawa .................... 369/30.27 |
| 2005/0249101 A1 * | 11/2005 | Tokunaga ..................... 369/217 |
| 2006/0198249 A1 * | 9/2006 | Okada ............................... 369/1 |
| 2007/0070849 A1 | 3/2007 | Saitoh et al. |
| 2008/0019224 A1 * | 1/2008 | Ishibashi .................... 369/30.03 |
| 2008/0080345 A1 | 4/2008 | Hasegawa |
| 2008/0196049 A1 | 8/2008 | Lu |
| 2010/0002554 A1 | 1/2010 | Nakano et al. |
| 2010/0118675 A1 * | 5/2010 | Nakano et al. ............. 369/53.21 |
| 2011/0075996 A1 * | 3/2011 | Mikami ........................ 386/353 |
| 2012/0297401 A1 | 11/2012 | Ahn |

OTHER PUBLICATIONS

PCT Demand for International Preliminary Examination (Chapter II) and Amendment under Article 34 dated Oct. 15, 2014, International Application No. PCT/US2014/018405.

* cited by examiner

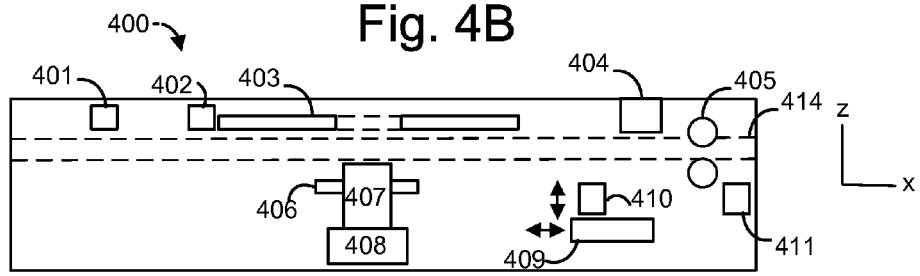
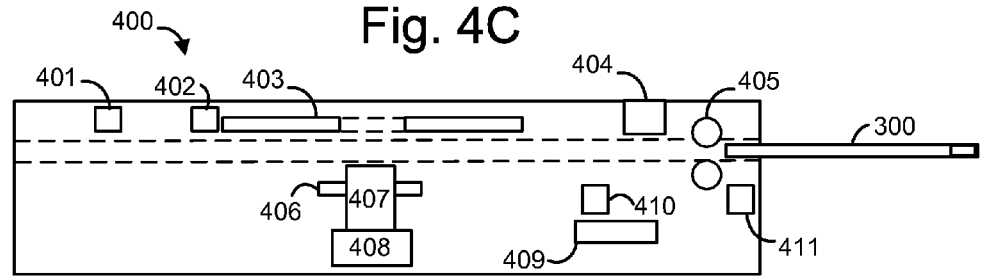
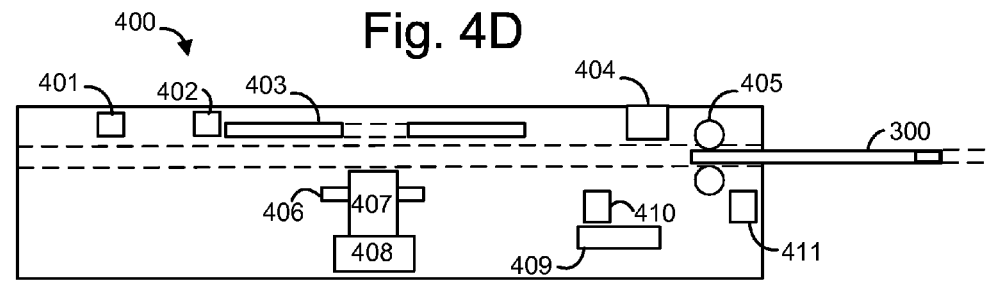
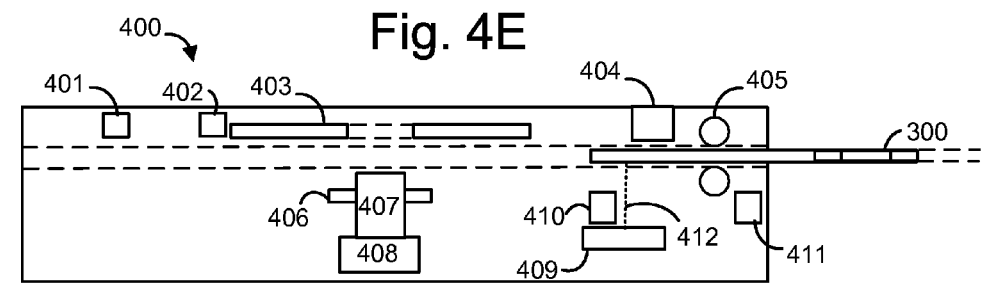

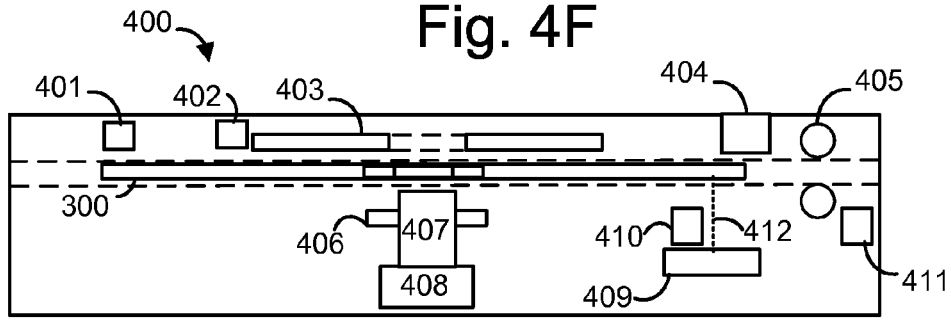
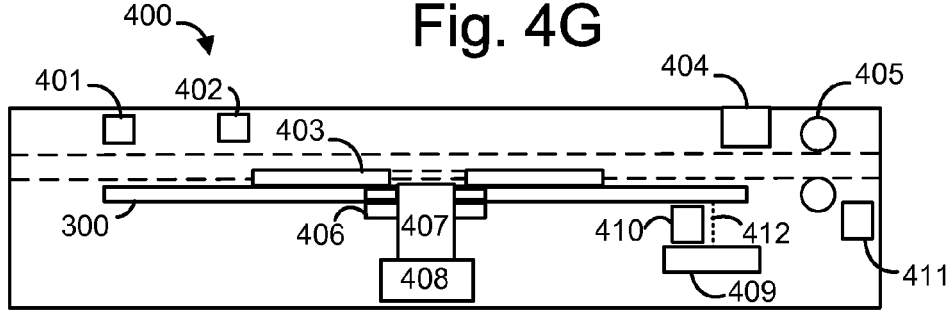
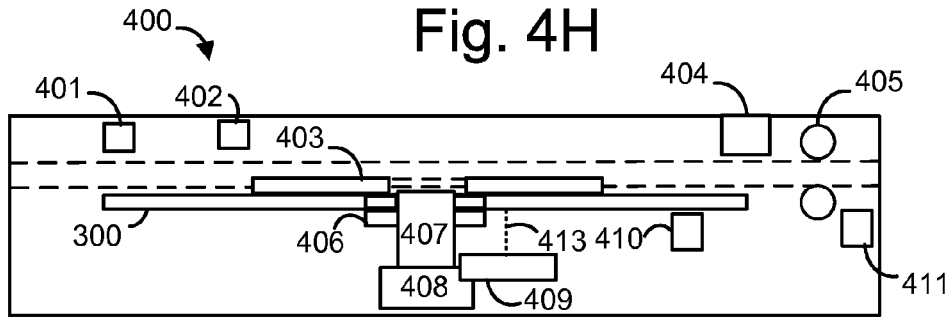
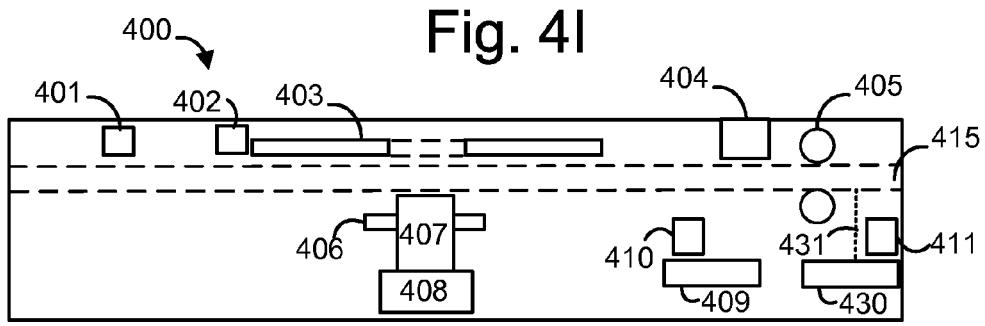

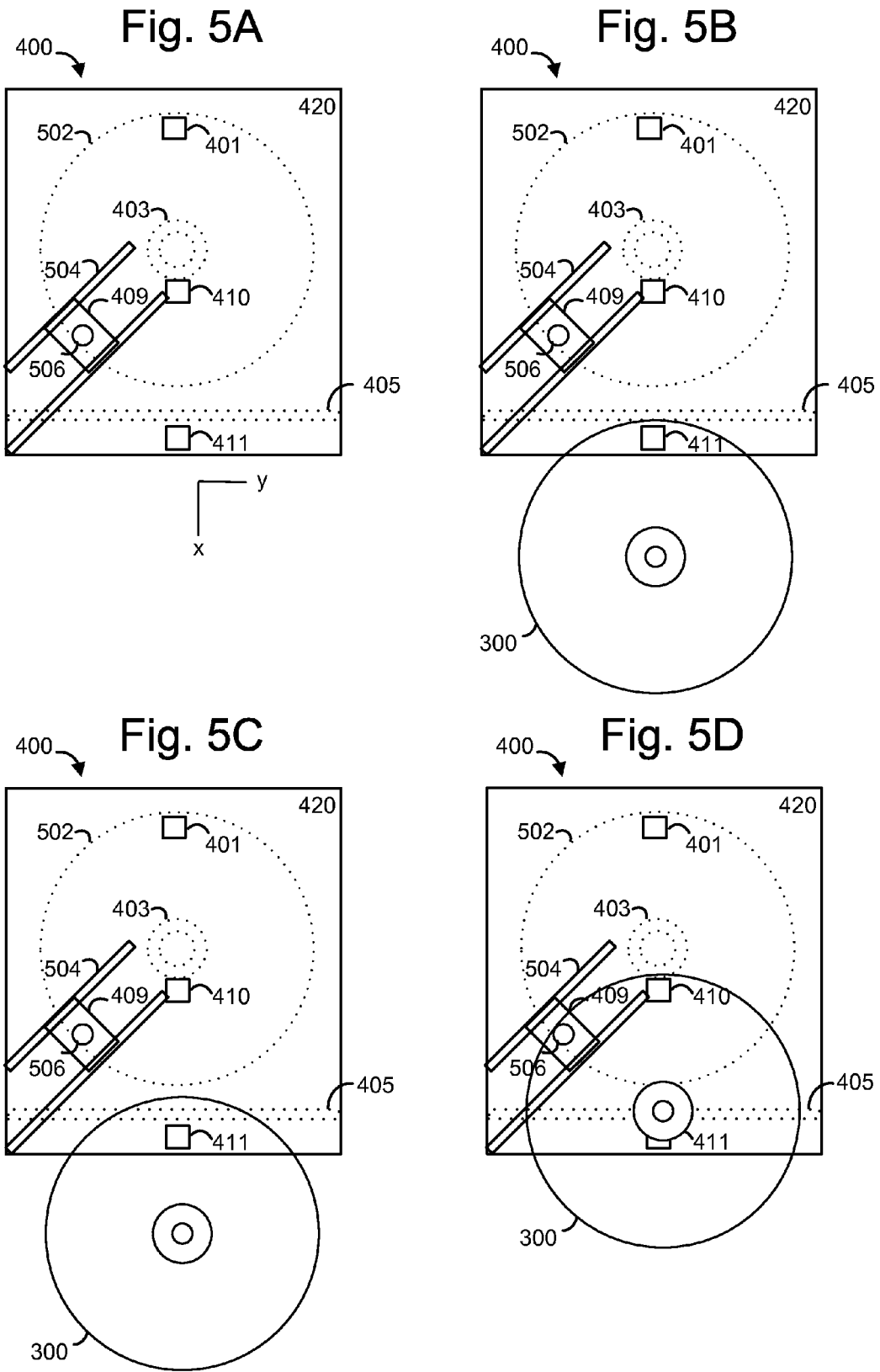

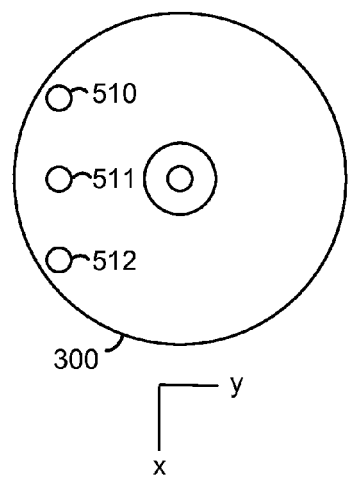

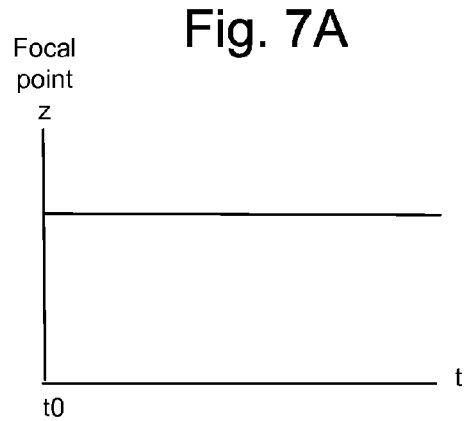
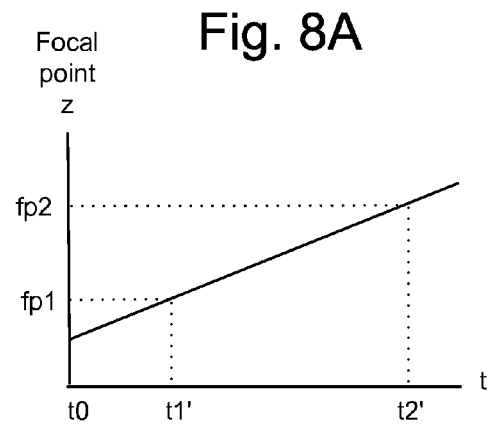
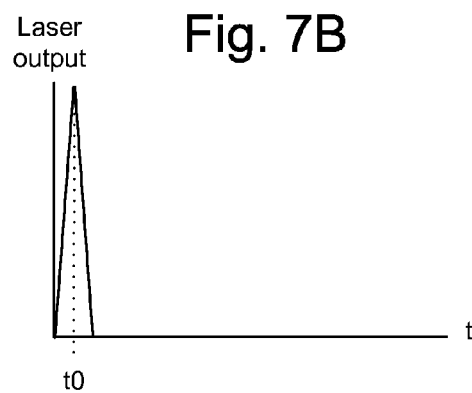
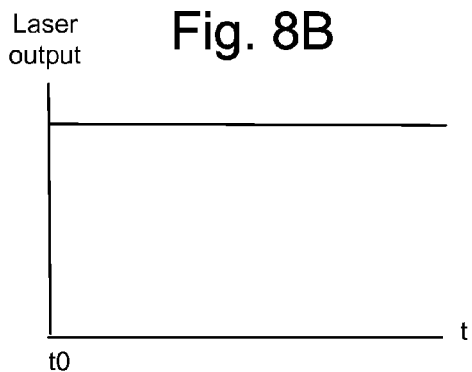
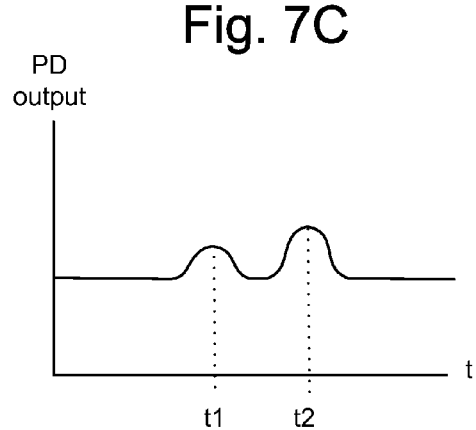
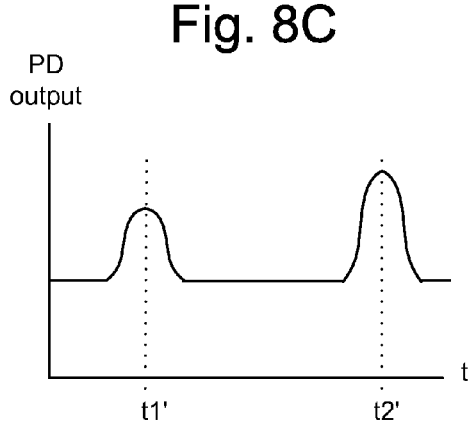

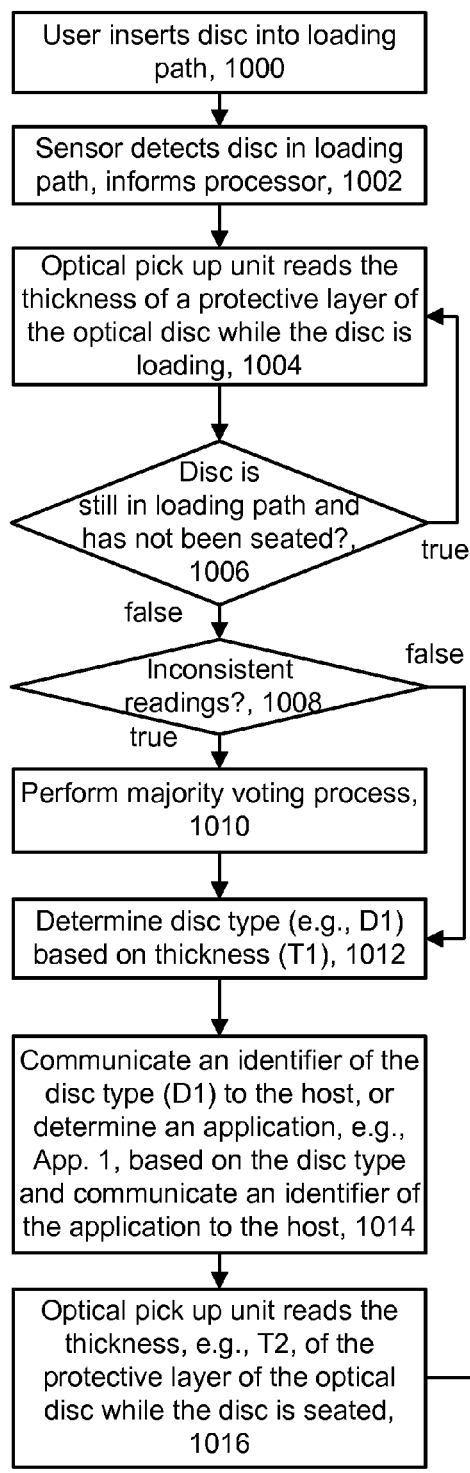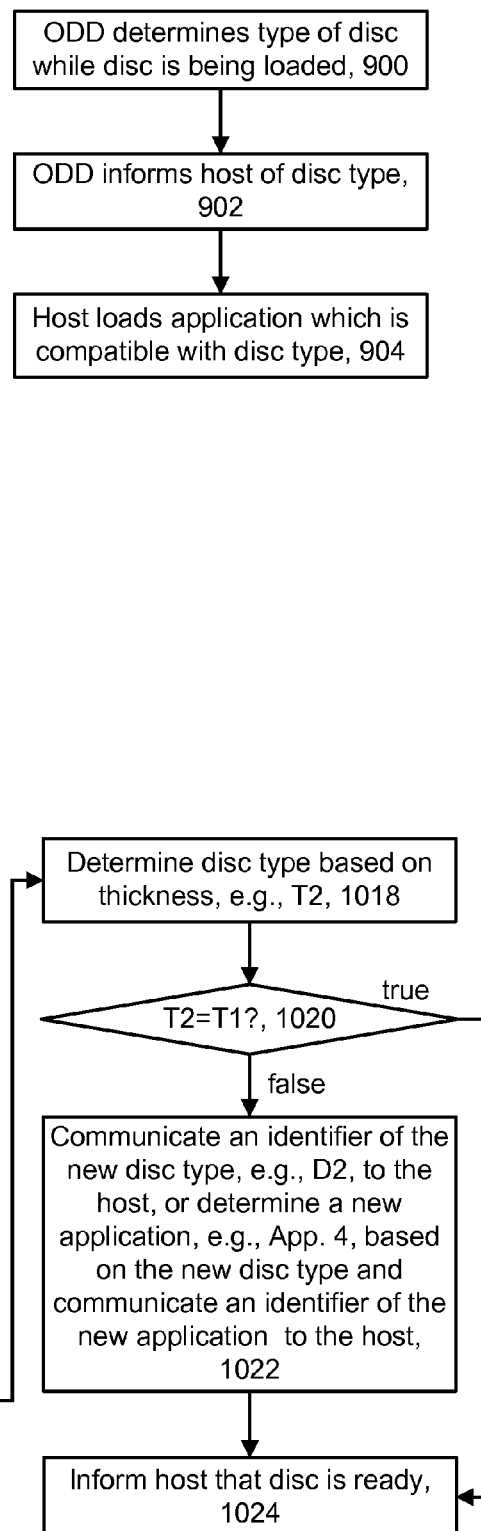

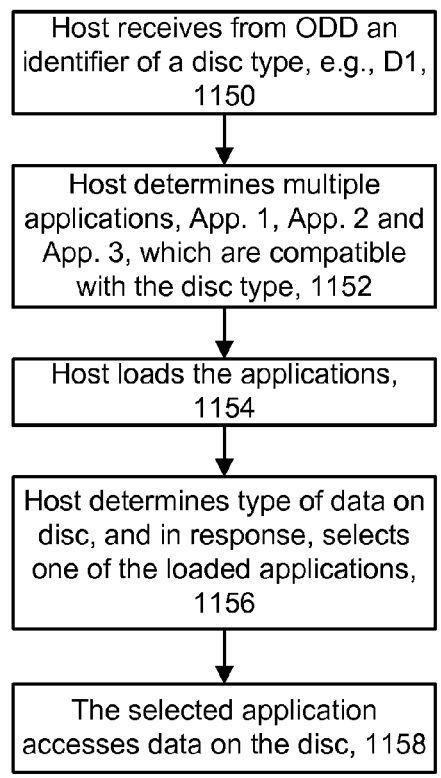

MEDIA DETECTION DURING DISC INSERTION

BACKGROUND

Optical discs are a common type of portable media used in computing systems such as personal computers, laptops and multimedia/game consoles. Different types of data can be stored in a digital format on such discs. For example, the compact disc (CD), digital video/versatile disc (DVD) and Blu-ray® disc (BD) are in common use. The CD has been used for storing audio recordings as well as other data. The DVD has been used for storing larger amounts of data, including broadcast-quality digital video. The BD can store even more data such a high-definition video. Many variations of the optical discs are available as well. Current optical drives use either a tray-loading mechanism, where the disc is loaded onto a motorized or manually operated tray, or a slot-loading mechanism, where the disc is slid into a slot and drawn in by motorized rollers or levers.

SUMMARY

As described herein, techniques are provided for detecting a type of an optical disc while the optical disc is being loaded into an optical disc drive (ODD) and before the optical disc has been seated on a turntable of the ODD. An existing or new optical pick up unit can be used to take readings of the thickness of a protective layer of the optical disc. Based on the readings, a preliminary determination of the disc type is made and a host computing device launches an appropriate application.

In one approach, an optical disc drive includes a turntable adapted to seat an optical disc. One or more sensors can be provided in the loading path to detect the optical disc in the loading path, such as when a user manually inserts the disc into a slot in the ODD. An optical pick up unit is provided with one or more lasers. A processor is in communication with the switch and the optical pick up unit. The processor, responsive to the switch, uses the optical pick up unit to measure a thickness of a protective layer the optical disc while the optical disc is moving toward the turntable, and determines a type of the disc based on the thickness. The ODD can communicate the disc type to a host computing device, which determines an appropriate application for the disc type. Corresponding processes can be provided at the ODD and the host computing device.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 4B depicts a representation of a cross sectional view of the disc drive 400 of FIG. 4A along the dashed line 421, where no disc is being inserted.

FIG. 4C depicts a representation of a cross sectional view of the disc drive 400 of FIG. 4A along the dashed line 421, where the disc 300 is being inserted in the loading path in a first position which is sensed by a sensor 411.

FIG. 4D depicts a representation of a cross sectional view of the disc drive 400 of FIG. 4A along the dashed line 421, where the disc 300 is being inserted in the loading path in a second position in which the disc is engaged by rollers 405.

FIG. 4E depicts a representation of a cross sectional view of the disc drive 400 of FIG. 4A along the dashed line 421, where the disc 300 is being inserted in the loading path in a third position which is sensed by a sensor 410.

FIG. 4F depicts a representation of a cross sectional view of the disc drive 400 of FIG. 4A along the dashed line 421, where the disc 300 is at the end of the loading path in a fourth position which is sensed by a sensor 401.

FIG. 4G depicts a representation of a cross sectional view of the disc drive 400 of FIG. 4A along the dashed line 421, where the disc 300 is clamped to a turntable 406, and where an optical pickup unit 409 is in one location.

FIG. 4H depicts a representation of a cross sectional view of the disc drive 400 of FIG. 4A along the dashed line 421, where the disc 300 is clamped to a turntable 406, and where an optical pickup unit 409 is in another location.

FIG. 4I depicts an alternative to FIG. 4B, where an additional optical pickup unit 430 is provided.

FIG. 5A depicts a top view of an optical disc drive consistent with the view of FIG. 4B.

FIG. 5B depicts a top view of an optical disc drive consistent with the view of FIG. 4C.

FIG. 5C depicts a top view of an optical disc drive consistent with the view of FIG. 4D.

FIG. 5D depicts a top view of an optical disc drive consistent with the view of FIG. 4E.

FIG. 5E depicts a top view of an optical disc drive consistent with the view of FIG. 4G.

FIG. 5F depicts a top view of an optical disc drive consistent with the view of FIG. 4H.

FIG. 5G depicts locations 510-512 on the disc 300 in which thickness measurements are made.

FIGS. 7A to 7C depict an example technique for determining the thickness of the protective layer of an optical disc using a fixed focal point.

FIGS. 8A to 8C depict an example technique for determining the thickness of the protective layer of an optical disc using a varying focal point.

FIG. 9 depicts an example method for loading an application based on a type of a disc.

FIG. 10 depicts an example method used by an ODD to identify a disc type.

FIG. 11B depicts another example method used by a host computing device to load an application based on a disc type identifier received from an ODD, in which multiple applications are loaded.

FIG. 12A depicts a table which cross-references disc thickness to disc type, where the table can be maintained by a host or ODD.

FIG. 12B depicts a table which cross-references disc type to application type, where the table can be maintained by a host.

FIG. 12C depicts a table which cross-references disc type to application type, where the table can be maintained by an ODD.

DETAILED DESCRIPTION

Figure 1:
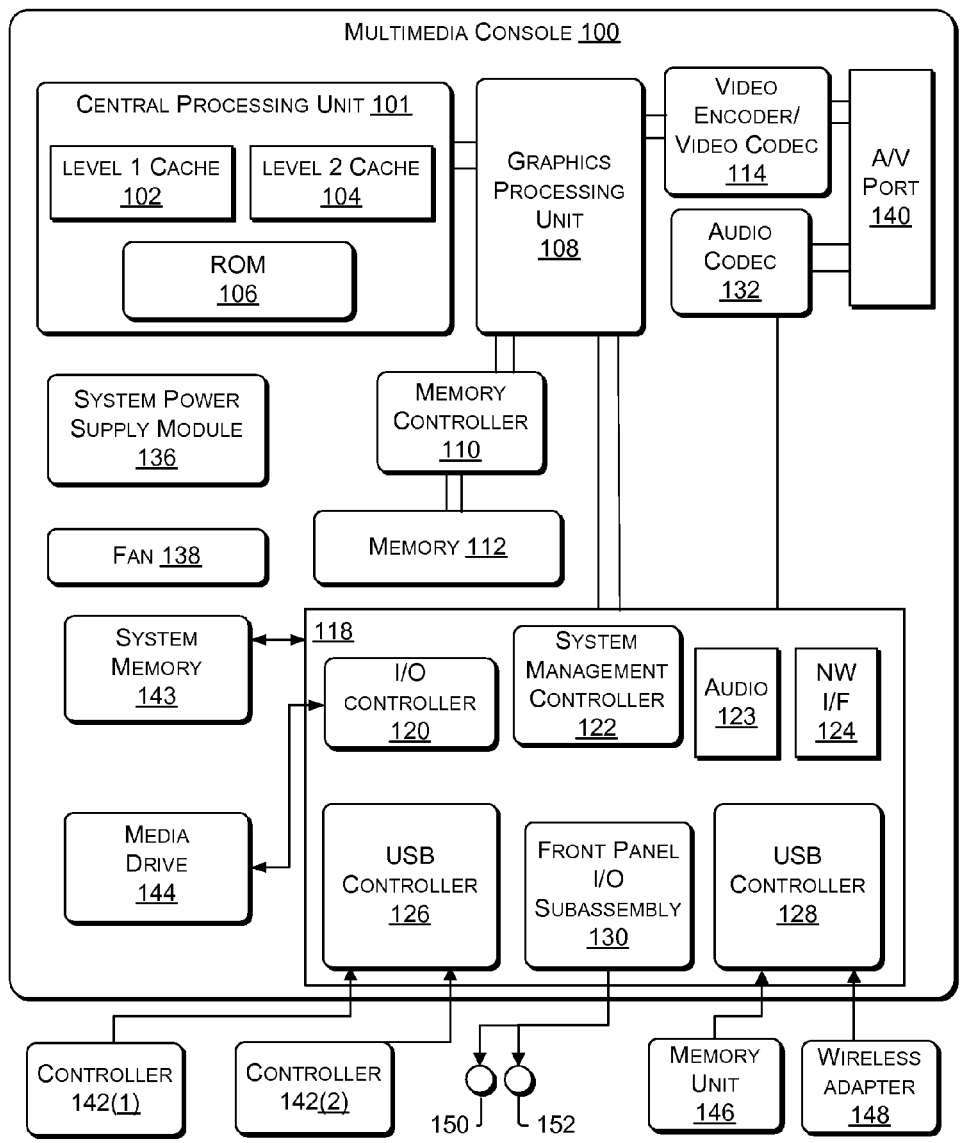
FIG. 1 depicts an example block diagram of a multimedia console which uses an optical disc drive.

As mentioned at the outset, optical discs are commonly used by computing systems such as personal computers, laptops and multimedia/game consoles. An optical disc drive (ODD) uses a loading mechanism to load an optical disc in to the point where it can be seated on a turntable and spun up to an operating speed at which it can be read or written to. Moreover, the ODD may perform calibrations such as by positioning a lens in an appropriate position relative to the disc and adjusting a power of the laser. Further, many ODDs are compatible with different types of discs. In this case, the ODD has the additional task of determining a type of the disc after the calibrations have been performed. However, this process can take several seconds, resulting in inconvenience for the user. Subsequently, the ODD informs a host computing device of the disc type. The host, in turn, identifies an application which should be loaded to access the disc, loads the application, and once it is fully loaded, can begin accessing the disc. The loading of the application is also time-consuming.

An ODD, associated host computing device, and techniques for operating the ODD and host computing device are provided herein to reduce the delay in loading an application by the host computing device to access a disc. In one aspect, the delay in detecting the type of an optical/media disc in an ODD is reduced by starting a media detection sequence while the media is being loaded into the ODD. Essentially, the type of the disc is detected while the disc is in a loading path of the ODD and before it is seated on the turntable. With this approach, any type of disc media type (e.g., Blu-ray®, DVD, CD, etc. . . . ) can be determined prior to the media being fully inserted into the drive. Software in the ODD or the host computing device can determine which application to load in order to handle the specific media type, even while the media is the process of being seated on a turntable (chucked) and spun up.

During media insertion, sensors can be provided in the ODD to detect how far the media has been inserted. After the media has crossed the OPU (optical pick-up unit), assembly containing the lasers for reading media, the lasers will turn on to detect the media type. In one approach, the media type is determined by timing reflections of the laser light from the cover and from the substrate/data-carrying layer of the disc. This indicates a thickness of a protective layer of the disc which can be correlated to a disc type. Moreover, due to mechanical vibrations during media loading, the laser can be used to take multiple readings to more accurately determine the media type. After this initial determination of media type is made, the ODD provide the media type to the host, which uses this information to load an appropriate application to playback the media type. For example, if the media is a Blu-ray movie, a media player application would be loaded in parallel with the continuing operations of the ODD. Once the ODD performs calibrations to read the disc, the movie can be played back instantly, or in a very short time, because the host application has already loaded or has started to load.

The ODD can make a final, more accurate determination of the disc type once the disc is seated and inform the host if the final determination is different than the preliminary determination.

FIG. 1 depicts an example block diagram of a multimedia console which uses an optical disc drive 144. The computing system may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise an optical disc drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be loaded or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
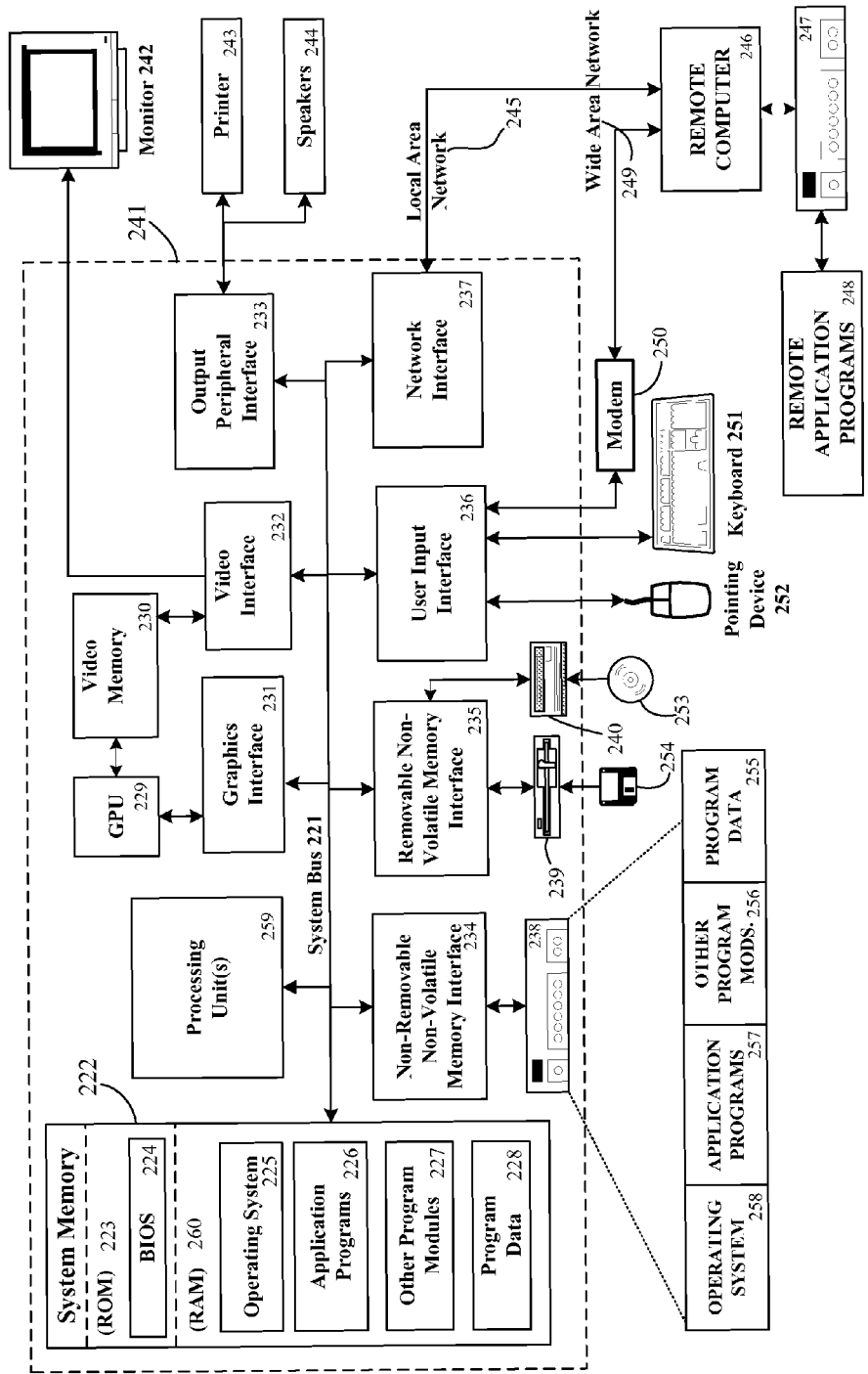
FIG. 2 depicts another example block diagram of a computing system which uses an optical disc drive.

FIG. 2 depicts another example block diagram of a computing system which uses an optical disc drive 240. The computing system 200 comprises a computer 241, which typically includes a variety of tangible computer-readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, operating system 225, application programs 226, other program modules 227, and program data 228 are provided.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disc drive 240 that reads from or writes to a removable, nonvolatile optical disc 253. Other removable/non-removable, volatile/nonvolatile tangible computer-readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disc drive 240 are typically connected to the system bus 221 by a removable memory interface, such as interface 235.

The drives and their associated computer storage media provide storage of computer-readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, remote application programs 248 reside on memory device 247. It will be appreciated that the network connections shown are exemplary and other means of establishing a communications link between the computers may be used.

The computing system can include a tangible computer-readable storage device or apparatus having computer-readable software embodied thereon for programming at least one processor to perform methods as described herein. The tangible computer-readable storage device can include, e.g., one or more of components 222, 234, 235, 230, 253 and 254. Further, one or more processors of the computing system can provide processor-implemented methods as described herein. The GPU 229 and the processing unit 259 are examples of processors.

Figure 3A:
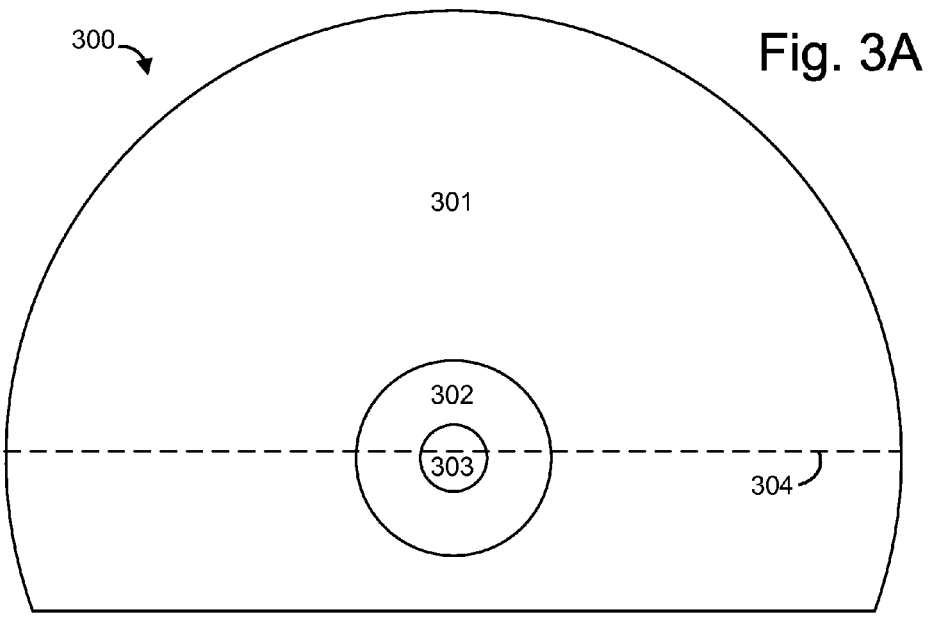
FIG. 3A depicts an example of an optical disc 300 having a data-carrying region 301, an inner hub region 302 which does not carry data and a central aperture 303.

FIG. 3A depicts an example of an optical disc 300 having a data-carrying region 301, an inner hub region 302 which does not carry data and a central aperture 303. Each family of optical discs is associated with a variety of standards relating to the physical and logical format of the disks and their operating conditions. For example, the laser wavelength and the numerical aperture (NA) of the objective lens with which the disc can be read and/or written to are specified, as well as the tracking method associated with the disc type. For example, the NA of the lens for CD, DVD or BD is 0.45-0.52, 0.60 or 0.85, respectively. For a CD, an infrared laser with a wavelength of 780 nm may be used. For a DVD, a red laser with a wavelength of 650 nm may be used. For a BD, a blue/violet laser with a wavelength of 405 nm may be used. For an ODD which accommodates CDs and DVDs, a twin laser pickup may be used in which two laser units share one objective lens. When BDs are also accommodated, a third laser unit may be used such as in a second optical pick up unit.

Figure 3B:
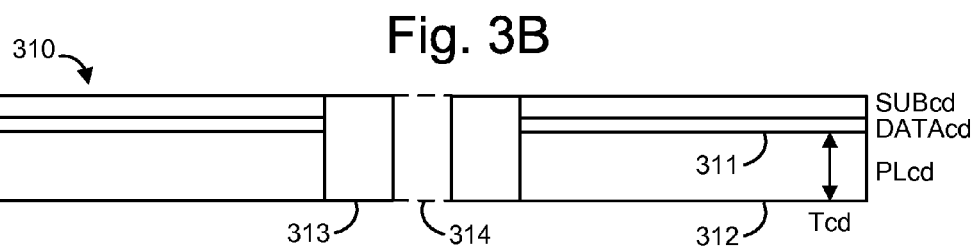
FIG. 3B depicts a compact disc (CD) 310 which is consistent with a cross-sectional view of the optical disc 300 of FIG. 3A along the dashed line 304.
Figure 3C:
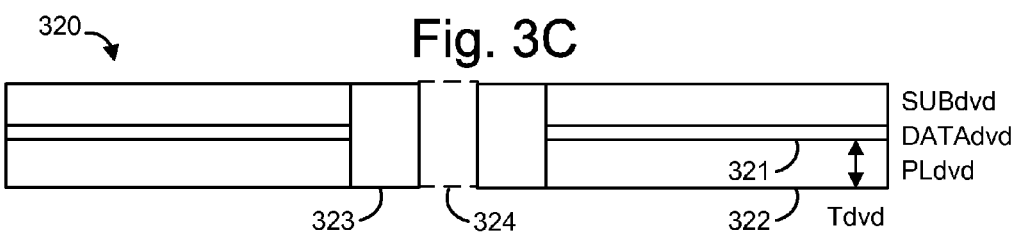
FIG. 3C depicts a digital video or versatile disc (DVD) 320 which is consistent with a cross-sectional view of the optical disc 300 of FIG. 3A along the dashed line 304.
Figure 3D:
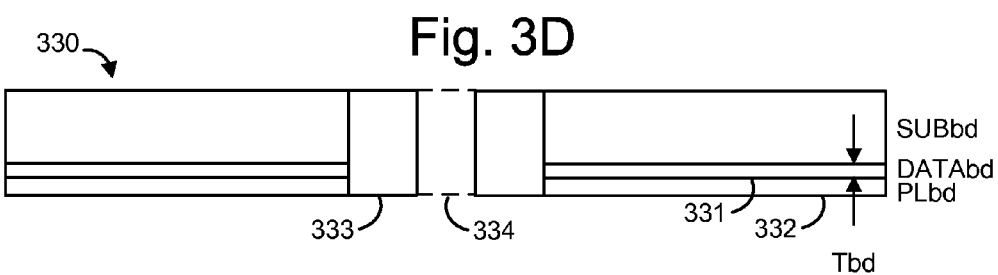
FIG. 3D depicts a Blue-ray® disc (BD) 330 which is consistent with a cross-sectional view of the optical disc 300 of FIG. 3A along the dashed line 304.

Referring to FIGS. 3B to 3D, different types of optical discs have a different thickness of a protective layer or substrate which is between the data-carrying layer of the disc and the cover of the disc which faces the optical pick up unit of the ODD. These thicknesses are 1.2 mm, 0.6 mm and 0.1 mm for the CD, DVD and BD, respectively.

FIG. 3B depicts a compact disc (CD) 310 which is consistent with a cross-sectional view of the optical disc 300 of FIG. 3A along the dashed line 304. The disc includes a substrate layer SUBcd, data-carrying layer DATAcd with a surface 311, protective layer PLcd with a surface 312, an inner hub region 313 and a central aperture 314. The substrates and protective layer can be a material such as polycarbonate. Tcd is the thickness of PLcd.

FIG. 3C depicts a digital video or versatile disc (DVD) 320 which is consistent with a cross-sectional view of the optical disc 300 of FIG. 3A along the dashed line 304. The disc includes a substrate layer SUBdvd, data-carrying layer DATAdvd with a surface 321, protective layer PLdvd with a surface 322, an inner hub region 323 and a central aperture 324. Tdvd is the thickness of PLdvd.

FIG. 3D depicts a Blue-ray® disc (BD) 330 which is consistent with a cross-sectional view of the optical disc 300 of FIG. 3A along the dashed line 304. The disc includes a substrate layer SUBbd, data-carrying layer DATAbd with a surface 331, protective layer PLbd with a surface 332, an inner hub region 333 and a central aperture 334. Tbd is the thickness of PLbd.

Figure 4A:
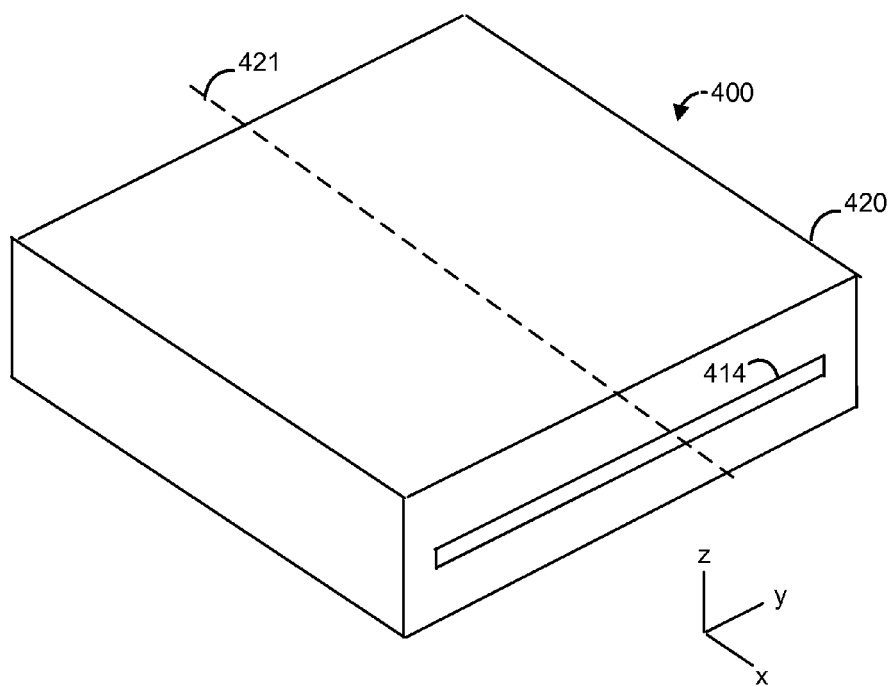
FIG. 4A depicts a perspective view of a disc drive 400 which includes a housing 420 and a loading path 414.

FIG. 4A depicts a perspective view of a disc drive 400 which includes a housing 420 and a loading path 414. The disc drive includes a housing 420 and a loading path 414 such as a slot in which a user inserts the disc. Cross-sectional views along the dashed line 421 are depicted in FIGS. 4B to 4I as a disc is being inserted into the disc drive. The disc drive can be integrated within a computing device or connected as a peripheral. An x-y-z coordinate system is also depicted.

FIG. 4B depicts a representation of a cross sectional view of the disc drive 400 of FIG. 4A along the dashed line 421, where no disc in being inserted. As mentioned, optical drives can use a tray-loading mechanism, where the disc is loaded onto a motorized or manually operated tray, or a slot-loading mechanism, where the disc is slid into a slot and drawn in by motorized rollers or levers. A slot-loading mechanism with motorized rollers is depicted as an example but the concepts provided herein are applicable to any type of loading mechanism. Moreover, the concepts are applicable to ODDs in which loading is performed by a user as well as ODDs in which loading occurs purely automatically without a user touching the disc such as in a so-called jukebox.

The loading path can extend in a direction (e.g., x direction) which perpendicular to an axis of the turntable (e.g., z direction).

A user inserts a disc in a loading path represented by dashed lines 414. The loading path can be on one plane in the z direction. Sensors 401, 410 and 411 detect the presence of the disc in the loading path. An optical pickup unit 409 can move radially and has a lens which can move vertically, e.g., toward and away from the disc, in one approach. The optical pickup unit 409 could also move toward and away from the disc. Rollers 405 are operated by a motor 404 to pull in the disc along the loading path. When the disc is fully inserted in the loading path, it drops into a region in which it is seated on a turntable 406 driven by a motor 408 via a shaft 407. In this case, the plane in which the disc is seated is lower than the loading plane. The motor and shaft may be considered to be a spindle. In a seating (chucking) process, a clamping ring 403 operated by a motor 402 is positioned directly on top of the disc to hold it in place when the disc is rotated. The clamp may be magnetically attracted to the spindle. This is one example approach of a loading process, as there are many other possible implementations.

FIG. 4C depicts a representation of a cross sectional view of the disc drive 400 of FIG. 4A along the dashed line 421, where the disc 300 is being inserted in the loading path in a first position which is sensed by a sensor 411. Here, the user is placing the edge of the disc into the loading path, triggering the sensor 411. The disc has not yet reached the rollers 405. In one approach, the sensor 411 can activate the motor 404 which rotates the rollers. The sensor can also wake up the ODD, powering it on and preparing it to begin sensing the disc. Thus, the rollers can start turning as soon as the user puts the disc in to provide a smooth user experience.

FIG. 4D depicts a representation of a cross sectional view of the disc drive 400 of FIG. 4A along the dashed line 421, where the disc 300 is being inserted in the loading path in a second position in which the disc is engaged by rollers 405. The rollers may be spring biased toward one another so that they clamp the disc, pulling it in along the loading path.

FIG. 4E depicts a representation of a cross sectional view of the disc drive 400 of FIG. 4A along the dashed line 421, where the disc 300 is being inserted in the loading path in a third position which is sensed by a sensor 410. When the sensor 410 is triggered, the optical pickup unit 409 begins emitting light 412 toward the disc in an attempt to determine the thickness of the protective layer. See, e.g., FIGS. 7A to 8C for further details. In one approach, multiple readings are taken.

FIG. 4F depicts a representation of a cross sectional view of the disc drive 400 of FIG. 4A along the dashed line 421, where the disc 300 is at the end of the loading path in a fourth position which is sensed by a sensor 401. At this time, the disc is aligned with the turntable and can be seated on it.

FIG. 4G depicts a representation of a cross sectional view of the disc drive 400 of FIG. 4A along the dashed line 421, where the disc 300 is clamped to a turntable 406, and where an optical pickup unit 409 is in one location. The clamping ring 403 is released from a held position using the motor 402 and forced against the disc by a magnetic force, in one approach. The clamping ring 403 rotates with the disc, holding it in place. The optical pickup unit 409 can make additional readings of the thickness of the protective layer of the optical disc while it is at the same position as when the previous readings were taken, in one approach. In this example, the optical pickup unit 409 is near an outer edge of the disc. The thickness reading at this point is a final reading. The disc can be fixed or spinning FIG. 4H depicts a representation of a cross sectional view of the disc drive 400 of FIG. 4A along the dashed line 421, where the disc 300 is clamped to a turntable 406, and where an optical pickup unit 409 is in another location. In this example, the optical pickup unit 409 is near an inner edge of the disc. The optical pickup unit 409 begins emitting light 413 toward the disc in an attempt to determine the thickness of the protective layer. Thus, the same optical pickup unit can be used to take thickness readings while the disc is in the loading path and not yet seated on the turntable, and while the disc is seated on the turntable. The thickness reading at this point is a final reading. The disc can be fixed or spinning FIG. 4I depicts an alternative to FIG. 4B, where an additional optical pickup unit 430 is provided. In this approach, the additional optical pickup unit 430 is dedicated to take thickness readings while the disc is in the loading path. The optical pickup unit 409 could be dedicated to take thickness readings while the disc is seated. The readings can be taken sooner than in the case of FIG. 4E because the additional optical pickup 430 unit is closer to the start of the loading path than is the optical pickup unit 409. The additional optical pickup 430 emits laser light 431.

FIG. 5A depicts a top view of an optical disc drive consistent with the view of FIG. 4B. The housing 420, rollers 405, sensors 401, 410 and 411, clamping ring 403 and optical pickup unit 409, discussed previously, are depicted. The optical pickup unit 409 has a lens 506 and is depicted as moving radially along the disc on rails 504. A dashed circle 502 indicates a position of the disc (not shown) when it is seated.

FIG. 5B depicts a top view of an optical disc drive consistent with the view of FIG. 4C. Here, the disc 300 is inserted so that its presence in the loading path is detected by a sensor 411. The disc is moving in the −x direction. At this time, the optical pickup unit should be moved to an optimal position for reading the disc, to a furthest extent along the x direction, if the optical pickup unit is not already in that position. In this example, the optical pickup unit moves at roughly a 45 degree angle to the x axis. In other implementations, the optical pickup unit could move directly along the x-axis so that it can be as close to the entrance slot of the ODD as possible to begin sensing the disc as soon as possible.

FIG. 5C depicts a top view of an optical disc drive consistent with the view of FIG. 4D. In this case, the disc has been pinched by the rollers 405 and is being pulled in.

FIG. 5D depicts a top view of an optical disc drive consistent with the view of FIG. 4E. In this case, the sensor 410 determines that the disc is in a position in which the optical pickup unit can begin to make readings. The optical pickup unit can make multiple readings such as depicted in FIG. 5G.

FIG. 5E depicts a top view of an optical disc drive consistent with the view of FIG. 4G. The sensor 401 determines that the disc has been fully loaded and the disc is seated. In this case, the optical pick up unit remains at an outer edge of the disc.

FIG. 5F depicts a top view of an optical disc drive consistent with the view of FIG. 4H. In this case, the optical pick up unit moves to an inner edge of the data-carrying region of the disc.

FIG. 5G depicts locations 510-512 on the disc 300 in which thickness measurements are made. The number of readings which can be made depends on the speed of the disc in the loading path and the frequency with which readings can be taken. As an example, the disc may pass over the optical pickup unit for about 1-2 seconds, and a disc identification cycle may take about 0.5 sec. In this example, three readings are taken.

Figure 6:
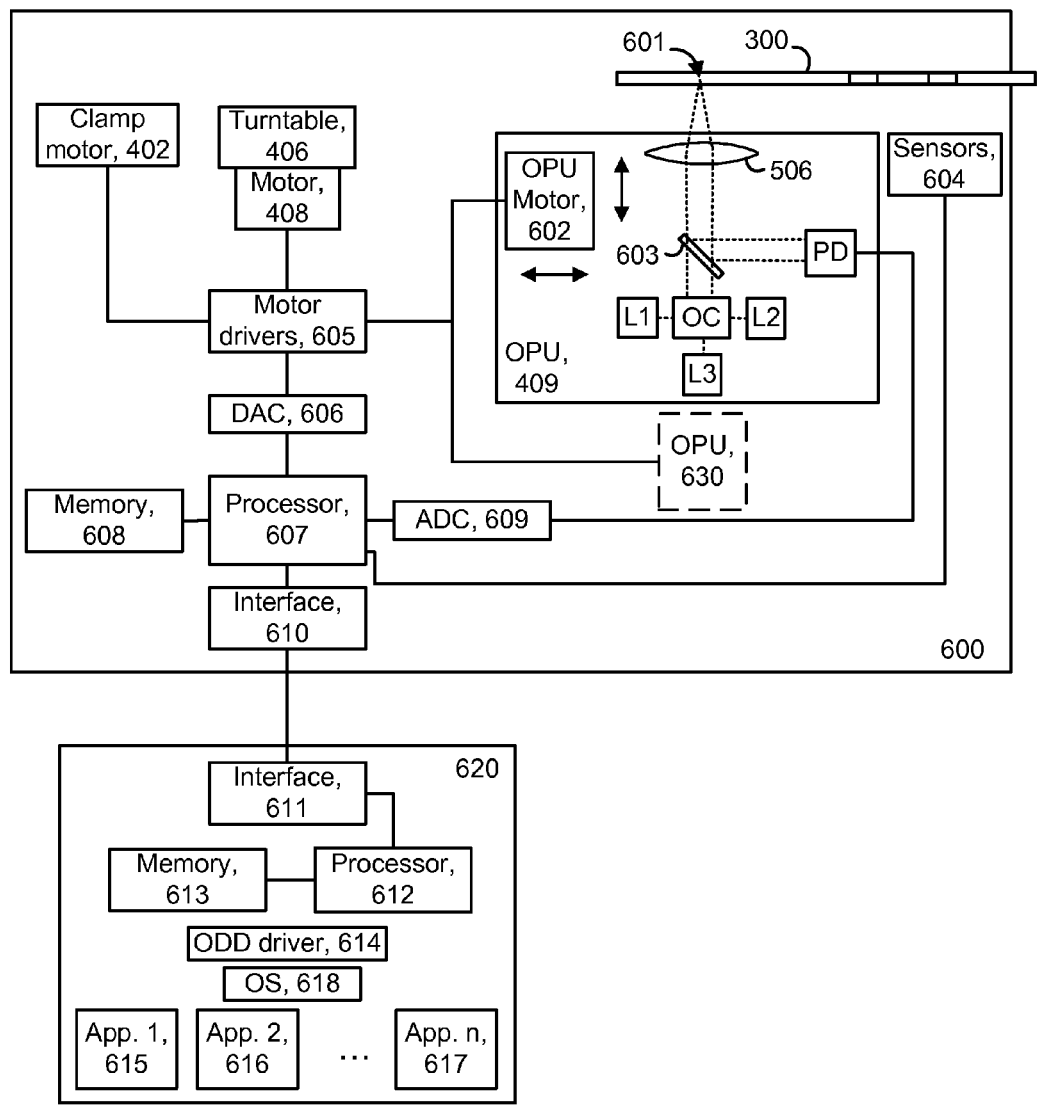
FIG. 6 depicts an example circuit consistent with the optical disc drive 400 of FIG. 4B.

FIG. 6 depicts an example circuit consistent with the optical disc drive 400 FIG. 4B. An ODD 600 and a host computing device 620 can communicate via respective interfaces 610 and 611. The ODD includes a clamp motor 402, turntable 406, motor 408 and optical pickup unit (OPU) 409, as discussed previously. The OPU includes a motor 602 which can move the OPU radially with respect to the disc as well as moving a lens 506 closer to or further away from the disc. Motor drivers 605 drive these motors in response to signals from a digital-to-analog converter (DAC) 606, which in turn is responsive to a processor 607. The processor may execute code stored in a memory 608.

In one possible implementation, the OPU 409 includes lasers (light sources) L1, L2 and L3 for use with CDs, DVDs or BDs, respectively. An optical coupler routes light from one of the lasers to the lens via a mirror 603. The light has a focal point 601 on the disc 300, for instance. Reflected light from the disc is sensed by a photo detector (PD) (light detector). An analog-to-digital converter (ADC) 609 converts analog signals from the PD and provides them to a processor 607 where intensity peaks can be determined. In another possible implementation, an additional OPU 630 with a laser and separate lens is provided for sensing a BD, for instance.

The sensors block 604 can represent sensors 401, 410 and 411 as discussed. The sensors can be of any type. Examples include optical and mechanical limit switches. For example, an optical limit switch in a photo interrupter may emit an infrared beam which reflects from the disc and is detected by a photo detector receiver. The switch is tripped if the beam is interrupted, indicating that the disc has been inserted to the location of the switch.

In the host computing device 620, the processor 612 executes code from the memory 613 to provide the desired functionality. For example, the code may provide an ODD driver 614, an operating system 618 and example applications App. 1 615, App. 2 616, . . . , App. n 617.

FIGS. 7A to 7C depict an example technique for determining the thickness of the protective layer of an optical disc using a fixed focal point. In this approach, the lens can be at a fixed distance from the disc so that the focal point is also at a fixed distance relative to the disc (FIG. 7A). One, or multiple pulses of light are emitted by the laser (FIG. 7B). An optimal position of the focal point can be set based on the known position of the loading plane along the z axis. In some cases, this position is higher than the position in which the disc is seated. Since the focal point is fixed, it may not be exactly at the disc surface or data-carrying layer, so that the reflections which are detected from the optical disc may be relatively weak. However, a thickness reading can be obtained as long as two intensity peaks can be detected in the PD output (FIG. 7C). The time between the intensity peaks (t2-t1) can be related to a thickness based on knowledge of the speed of the laser light in the protective layer of the disc. For example, the refractive index=1.55 for polycarbonate, an example material for the protective layer of the disc. The speed of light is then c/1.55 and the distance the light travels through the protective layer from the outer surface to the data-carrying layer and reflected back out from the data-carrying layer to the outer surface is c/1.55 (t2-t1), where c=3×10^8 m/sec. The thickness is then half of this distance.

FIG. 7B depicts a single laser pulse as an example but repeated pulses can be emitted to obtain multiple thickness readings. This approach may be most appropriate when the disc is in the loading path. Similarly, FIG. 7C depicts a single pair of intensity peaks but multiple pairs can be detected when repeated laser pulses are used. The peak at t1 represents a reflection from the surface of the protective layer and the peak at t2 represents a reflection from the data-carrying layer which may be stronger due to a higher reflectivity of the data-carrying layer.

The intensity of the reflection can be a function of the disc type and the laser light. As mentioned, CDs, DVDs and BDs are typically read using a different wavelength of light. That is, each disc type is most reflective to a specific wavelength of light. In one approach, the readings are made using one wavelength of light which achieves adequate results with different disc types. In another approach, the readings are made using different wavelengths of light. If one optical pickup unit is used which can emit one wavelength at a time, the different wavelengths may be selected one after another. Or, one wavelength can be used for multiple pulses, then another wavelength can be used for multiple pulses, and so forth. If multiple optical pickup units are used, they can take separate readings using different wavelengths at the same time.

In one approach, the optical pick up unit uses laser light having a first wavelength to measure the thickness of the protective layer of the optical disc while the optical disc is moving in the loading path toward the turntable, and laser light having a second wavelength to measure the thickness of the protective layer of the optical disc while the optical disc is seated on the turntable.

FIGS. 8A to 8C depict an example technique for determining the thickness of the protective layer of an optical disc using a varying focal point. This approach may be most appropriate when the disc is seated. In this approach, the focal point can be moved at a fixed velocity (v) away from or toward the optical disc as depicted in FIG. 8A. Intensity peaks in the reflected light can be detected such as depicted in FIG. 8C. The laser output can be fixed such as depicted in FIG. 8B. In this example, the reflection intensity peaks are at t1' and t2', when the focal point is at distances fp1 and fp2, respectively, along the z axis. The distance between the focal points, fp2-fp1, is the thickness of the protective layer. This distance is v×(t2'-t1'). This approach is typically more accurate since the intensity peaks are stronger, but may take longer per reading compared to the approach of FIGS. 7A to 7C.

FIG. 9 depicts an example method for loading an application based on a type of a disc. At step 900, the ODD determines a type of a disc while the disc is being loaded. At step 902, the ODD informs the host of the disc type. At step 904, the host loads an application which is compatible with the disc type. Further details of steps 900 and 902 are provided, e.g., in connection with FIG. 10. Further details of step 904 are provided, e.g., in connection with FIGS. 11A and 11B.

FIG. 10 depicts an example method used by an ODD to identify a disc type. At step 1000, the user inserts a disc into a loading path. At step 1002, one or more sensors detect the disc in the loading path and are tripped, thereby informing the processor. At step 1004, the optical pick up unit reads the thickness of a protective layer of the optical disc while the disc is loading. This provides an initial or preliminary thickness reading. Decision step 1006 determines if the disc is still in the loading path and has not been seated. If decision step 1006 is true, an additional reading is taken at step 1004. If decision step 1006 is false, e.g., the disc has been seated, step 1008 determines if the readings from step 1004 are inconsistent. In this case, step 1010 performs a majority voting process to select one of the readings. For, example, if there are three thickness readings, where two indicate Tcd and one indicates Tdvd, Tcd may be selected. A further check may require that a certain portion of the readings are consistent, e.g., 70%, or else the results are not used. Step 1012 determines a disc type (e.g., D1, representing a CD, DVD or BD) based on the thickness (T1). In one approach, the ODD maintains data which cross-references the thickness to an identifier of a disc type such as in FIG. 12A, and the ODD can read this table to determine the disc type. In practice, a proxy value for the thickness such as t2-t1 or t2'-t1' may be cross-referenced to an identifier of a disc type. Optionally, the ODD communicates the thickness or the proxy value for the thickness to the host computing device, which cross-references it to an appropriate application.

At step 1014, the ODD communicates an identifier of the disc type (D1) to the host, or determines an application, e.g., App. 1, based on the disc type (see FIG. 12B) and communicates an identifier of the application to the host. For example, ODD can maintain data which cross-references the disc type to an identifier of an application type.

At step 1016, the optical pick up unit again reads the thickness (e.g., T2) of the protective layer of the optical disc, but in this case, the disc is seated. This is considered to be a more accurate, final reading whose result should supersede the initial reading if they are inconsistent. This determination can be made while the disc is stationary or rotating.

Step 1018 determines a disc type based on the thickness (T2). Decision step 1020 determines if the thickness readings agree. If they agree, the ODD can inform the host that the disc is ready to be accessed (step 1024). If they do not agree, step 1022 is performed in which the ODD communicates an identifier of the new disc type (e.g., D2) to the host, or determines a new application, e.g., App. 4 (FIG. 12C), based on the new disc type and communicates an identifier of the new application to the host.

Figure 11A:
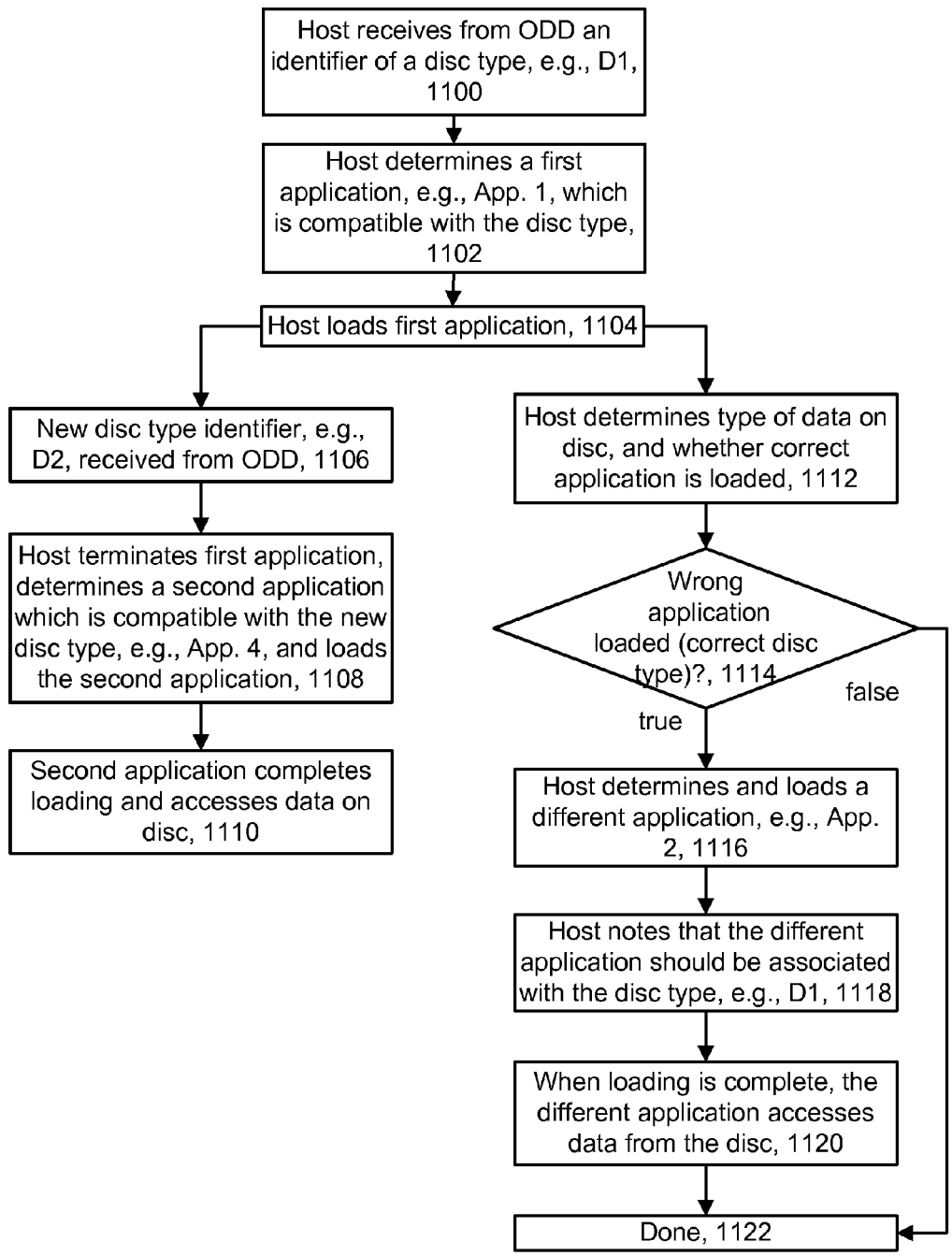
FIG. 11A depicts an example method used by a host computing device to load an application based on a disc type identifier received from an ODD.

FIG. 11A depicts an example method used by a host computing device to load an application based on a disc type identifier received from an ODD. At step 1100, the host receives from ODD an identifier of a disc type, e.g., D1. At step 1102, the host determines a first application, e.g., App. 1, which is compatible with the disc type, e.g., using the table of FIG. 12B. In one approach, multiple applications are associated with one disc type and the applications are listed in a ranked order, such that the first application on the list is selected. The order of the ranking can change based on the usage history of the application in accessing the ODD, as explained further below.

At step 1104, the host loads the first application. Loading an application refers to, e.g., copying code of the application from a storage device into a working memory which is directly accessible to a processor, and executing the code when the code has completed being loading into the memory. The loading can be performed by the operating system. Next, one of two paths is followed.

In a first path, if the ODD is still identifying the disc in the seated position, it may determine that the previous disc type which was reported to the host was erroneous. In this case, a new disc type, e.g., D2, is received from the ODD at step 1106. At step 1108, the host terminates the first application, determines a second application which is compatible with the new disc type, e.g., App. 4 (per FIG. 12B) and loads the second application. At step 1110, the second application completes loading and accesses data on the disc, assuming the ODD has informed the host that the disc is ready.

In a second path, if the ODD has completed identifying the disc in the seated position, and the disc type does not change, step 1112 is reached. Here, the host determines a type of data on the disc and whether the correct application has been loaded. The ODD has completed its laser calibrations and the disc is rotating at its intended speed at this point. For example, the operating system or a device driver can determine the type of data on the disc. One approach is to examine the directory and file structure of the data. For instance, BD-ROM application files are stored under a "BDMV" directory. If such a directory is detected, it can be concluded that the disc contains a Blue-ray® movie and an appropriate application for viewing the movie should be launched. Another approach is to examine a filename extension of the data. For example, BDs may use the filename extension MT2S, denoting the Blu-ray Disc Audio-Video (BDAV) MPEG-2 Transport Stream. If such a filename extension is detected, it can be concluded that the disc contains a Blue-ray® movie.

Example filename extension which are common on DVDs are: AVI (Audio Video Interleave), DivX, MPG or MPEG, WMV and MOV. Example filename extensions which are common on CDs might relate to static image data (e.g., TIF, JPG, PNG and GIF), word processing data (e.g., DOC) and spreadsheet data (e.g., XLS). Thus, different data types can be associated with one disc type and different applications may be appropriate for a given disc type depending on the type of the data. For example, in FIG. 12B, App. 1, App. 2 and App. 3 are associated with the same disc type D1.

Decision step 1114 determines if the wrong application has been loaded by the host (even though the disc type is correct). If decision step 1114 is true, the host determines and loads a different application at step 1116, based on the determined type of data at step 1112. At step 1118, the host notes that the different application should be associated with the disc type, such as by updating the table of FIG. 12B. For example, App. 2 may be the different application, so that App. 2 is moved above App. 1 in the row order. That is, App. 2 should be associated with the disc type D1 with a higher probability or priority than a probability or priority by which App. 1 is associated with the disc type. When loading is complete, the different application reads data from the disc (step 1120), assuming the ODD has informed the host that the disc is ready. The process is done at step 1122. If decision step 1114 is false, the process is done at step 1122.

FIG. 11B depicts another example method used by a host computing device to load an application based on a disc type identifier received from an ODD, in which multiple applications are loaded. In this example, the host receives an identifier of a disc type from the ODD and loads multiple applications which might be compatible with the data on the disc. For example, the different applications can be loaded using different processing cores.

At step 1150, the host receives from ODD an identifier of a disc type, e.g., D1. At step 1152, the host determines multiple applications, e.g., App. 1, App. 2 and App. 3, which are compatible with the disc type (using FIG. 12B). At step 1154, the host loads the applications.

Assuming the final disc identification has been completed by the ODD and does not conflict with the initial disc identification, and that the ODD has completed its laser calibrations and the disc is rotating at its intended speed, step 1156 is performed. Specifically, the host determines a type of data on the disc, similar to step 1112 of FIG. 11A, and, in response, selects one of the loaded applications. For example, a context switch to the selected application can be made while the remaining applications are terminated. At step 1158, the selected application accesses data on the disc.

This approach makes the appropriate application available as soon as possible.

FIG. 12A depicts a table which cross-references disc thickness to disc type, where the table can be maintained by a host or ODD. For example, the thicknesses Tcd, Tdvd, Tbd (or proxy values) are associated with a disc type of CD, DVD or BD, respectively.

FIG. 12B depicts a table which cross-references disc type to application type, where the table can be maintained by a host, for instance. For example, a disc type D1 (e.g., one of CD, DVD or BD) is associated with application types of App. 1, App. 2 and App. 3. A disc type D2 (e.g., another of CD, DVD or BD) is associated with an application type of App. 4. A disc type D3 (e.g., yet another of CD, DVD or BD) is associated with an application type of App. 5.

FIG. 12C depicts a table which cross-references disc type to application type, where the table can be maintained by an ODD. For example, the disc types of D1, D2 and D3 are associated with applications types of App. 1, App. 4 and App. 5, respectively.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. An optical disc drive, comprising:
   a turntable adapted to seat an optical disc;
   a loading path to the turntable;
   a switch in the loading path, the switch to detect movement of the optical disc in the loading path toward the turntable;
   an optical pick up unit; and
   a processor to communicate with the switch and the optical pick up unit, the processor, responsive to the switch, to use the optical pick up unit to measure a thickness of a protective layer of the optical disc while the optical disc is moving in the loading path toward the turntable and before the optical disc is seated on the turntable, and to determine a type of the optical disc based on the thickness.

2. The optical disc drive of claim 1, further comprising:
   an interface to a host computing device, the processor to communicate the type of the optical disc to the host computing device via the interface.

3. The optical disc drive of claim 1, further comprising:
   an interface to a host computing device, the processor to determine an application type which corresponds to the type of the optical disc based on a table which cross-references the thickness to the application type, and to communicate an identifier of the application type to the host computing device via the interface.

4. The optical disc drive of claim 1, wherein:
   the loading path is perpendicular to an axis of the turntable.

5. The optical disc drive of claim 1, further comprising:
   a clamping device which seats the optical disc on the turntable, the processor, responsive to the clamping device, to use the optical pick up unit to measure the thickness of the protective layer of the optical disc while the optical disc is seated on the turntable, and to compare the thickness measured while the optical disc is moving in the loading path toward the turntable to the thickness measured while the optical disc is seated on the turntable.

6. The optical disc drive of claim 1, wherein:
   the optical pick up unit uses laser light having a first wavelength to measure the thickness of the protective layer of the optical disc while the optical disc is moving in the loading path toward the turntable, and laser light having a second wavelength to measure the thickness of the protective layer of the optical disc while the optical disc is seated on the turntable.

7. The optical disc drive of claim 1, wherein:
   the optical pick up unit comprises a light source and a light detector, the light source to emit light toward the optical disc and the light detector to detect intensity peaks in reflected light from the optical disc, the thickness is determined based on the intensity peaks.

8. A method for identifying a type of an optical disc, comprising:
   detecting the optical disc being inserted into an optical disc drive while the optical disc is moving in a loading path toward a turntable, the turntable is adapted to seat the optical disc;
   in response to the detecting, using an optical pick up unit to measure a thickness of a protective layer of the optical disc while the optical disc is moving in the loading path toward the turntable and before the optical disc is seated on the turntable, the thickness indicates a type of the optical disc; and
   based on the thickness, initiating loading, at an associated host computing device, of an application which is compatible with the type of the optical disc.

9. The method of claim 8, further comprising:
   seating the optical disc on the turntable;
   using the optical pick up unit to measure the thickness of the protective layer of the optical disc while the optical disc is seated on the turntable; and
   comparing the thickness measured while the optical disc is moving in the loading path toward the turntable to the thickness measured while the optical disc is seated on the turntable.

10. The method of claim 9, further comprising:
    if the thickness measured while the optical disc is moving in the loading path toward the turntable differs from the thickness measured while the optical disc is seated on the turntable, initiating loading, at the associated host computing device, of a new application which is compatible with a type of the optical disc which is indicated by the thickness measured while the optical disc is seated on the turntable.

11. The method of claim 8, wherein:
    to measure the thickness while the optical disc is moving in the loading path toward the turntable, the optical pick up unit obtains a plurality of readings for the thickness and applies a majority voting process to the plurality of readings.

12. The method of claim 8, wherein:
    the initiating loading of the application comprises communicating an identifier of the type of the optical disc to the associated host computing device.

13. A computer-readable memory having computer-readable software embodied thereon for programming a processor to perform a method, the method comprising:
    receiving a communication from an optical disc drive, the communication comprises an identifier of a type of an optical disc which is detected by the optical disc drive;
    in response to the communication, accessing a table, the table cross-references the type to multiple applications which are compatible with the type, and initiating loading of the multiple applications before the optical disc is read in the optical disc drive;
    determining a type of data on the optical disc; and
    performing a context switch to one application of the multiple applications in response to the type of the data, while terminating remaining applications of the multiple applications; and
    using the one application to access the data.

14. The computer-readable memory of claim 13, wherein the method performed further comprises:
    noting that the one application should be associated with the type of the optical disc.

15. The computer-readable memory of claim 13, wherein the method performed further comprises:
    the determining the type of the data on the optical disc comprises examining a directory of the data.

16. The computer-readable memory of claim 13, wherein the method performed further comprises:
    the determining the type of the data on the optical disc comprises examining a file structure of the data.

17. The computer-readable memory of claim 13, wherein the method performed further comprises:
    the determining the type of the data on the optical disc comprises examining a filename extension of the data.

* * * * *